(12) United States Patent
Ishimaru

(10) Patent No.: US 6,347,190 B1
(45) Date of Patent: Feb. 12, 2002

(54) DISPLAY DEVICE OF AN OPTICAL APPARATUS

(75) Inventor: Toshiaki Ishimaru, Hino (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/499,971

(22) Filed: Feb. 8, 2000

(30) Foreign Application Priority Data

Feb. 8, 1999 (JP) ............................................ 11-029823

(51) Int. Cl.$^7$ ........................... G03B 13/16; G03B 17/20
(52) U.S. Cl. ...................... 396/121; 396/147; 396/287; 396/296; 396/436
(58) Field of Search ................................ 396/147, 148, 396/296, 287, 281, 435, 436, 121, 122, 123, 380, 378

(56) References Cited

U.S. PATENT DOCUMENTS 6,167,203 A * 12/2000 Ishimaru et al. ......... 396/296 X
6,172,724 B1 * 1/2001 Kato ....................... 396/296 X

FOREIGN PATENT DOCUMENTS

JP          5-165017          6/1993

* cited by examiner

Primary Examiner—W. B. Perkey
(74) Attorney, Agent, or Firm—Straub & Pokotylo; JOhn C. Pokotylo

(57) ABSTRACT

A camera has a finder device. A liquid crystal element is arranged in the finder device and has an image area and at least one of an index area indicating an image range and an index area indicating information relating to photographing. A control circuit switches modes between a first mode in which the image area is set into a light transmitting state and a second mode in which the image area is set into a light shielding state according to a voltage applied to the liquid crystal element. The index areas always provide index display irrespective of application of the voltage to the liquid crystal element.

14 Claims, 4 Drawing Sheets

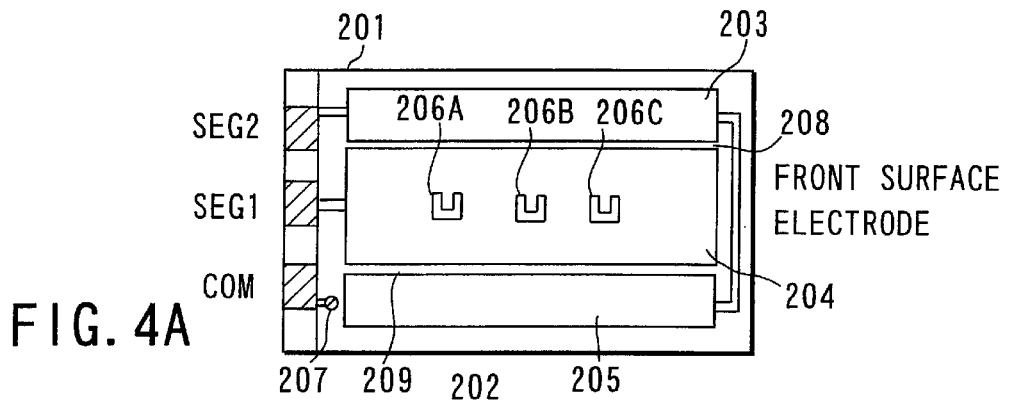
FIG. 4A
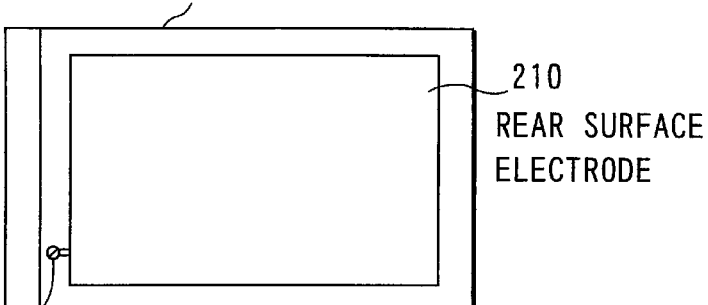
FIG. 4B
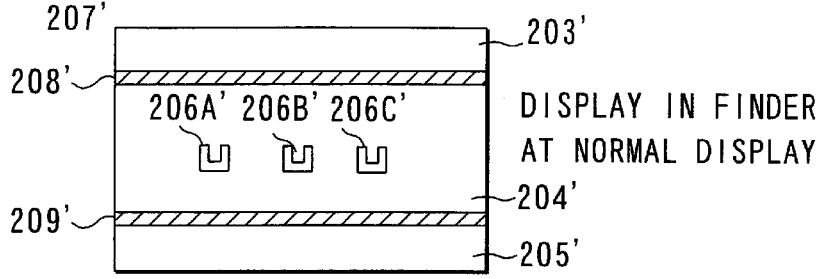
FIG. 4C  DISPLAY IN FINDER AT NORMAL DISPLAY
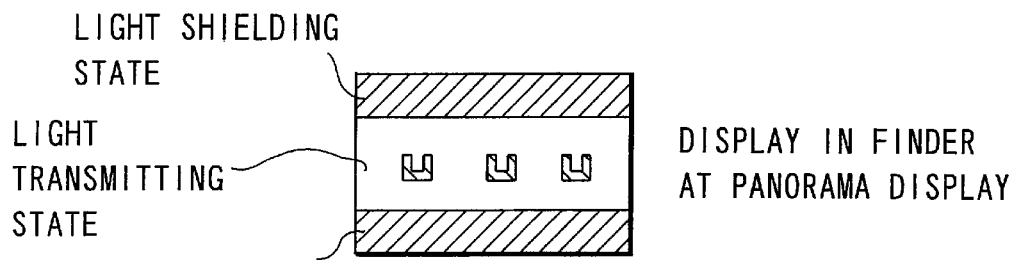
FIG. 4D  DISPLAY IN FINDER AT PANORAMA DISPLAY
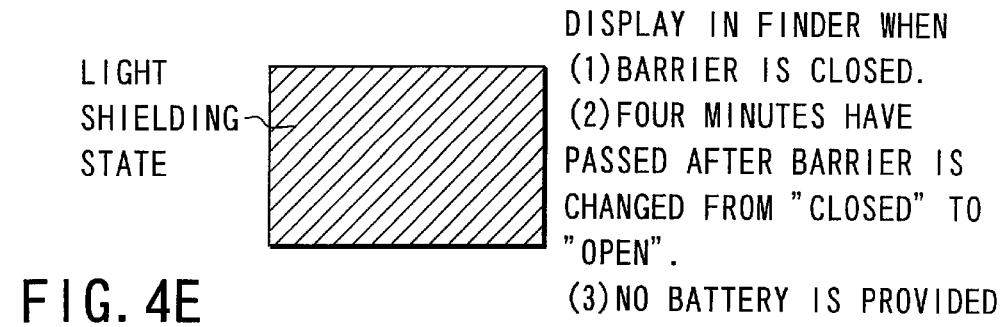
FIG. 4E  DISPLAY IN FINDER WHEN (1) BARRIER IS CLOSED. (2) FOUR MINUTES HAVE PASSED AFTER BARRIER IS CHANGED FROM "CLOSED" TO "OPEN". (3) NO BATTERY IS PROVIDED

DISPLAY DEVICE OF AN OPTICAL APPARATUS

CROSS-REFERENCE TO RELATED APPLICATION

This application is based upon and claims the benefit of priority from the prior Japanese Patent Application No. 11-029823, filed Feb. 8, 1999, the entire contents of which are incorporated herein by reference.

BACKGROUND OF THE INVENTION

This invention relates to a display device of an optical apparatus.

A camera is provided as one of optical apparatuses and it is conventionally proposed to use a liquid crystal for a display section in the finder of the camera. Display of an AF target and various modes and display on switching of the angles of a view such as a panorama view and normal view are provided by use of the liquid crystal. As the type of the liquid crystal, positive type LCDs such as a so-called TN (twisted nematic) type LCD (which is hereinafter referred to as a TN-LCD) and guest host LCD (which is hereinafter referred to as a GH-LCD) are conventionally frequently used.

Recently, as is disclosed in Jpn. Pat. Appln. KOKAI Publication No. 5-165017, it is proposed to use a high polymer dispersion type liquid crystal (which is hereinafter referred to as a PN-LCD) for the finder of the camera. The PN-LCD permits incident light to be scattered or transmitted as it is according to the voltage application state. Since the degree of scattering is high in the PN-LCD when the incident light is scattered, the amount of light which is directly incident on the eye becomes extremely small if it is used for the finder and the light shielding state or dark state can be attained as if light is mechanically shielded. A high contrast finder can be constructed by use of the PN-LCD in comparison with the TN-LCD and GH-LCD.

As the above types of liquid crystals, a negative type liquid crystal in which the light transmitting state is attained when a voltage is applied thereto and the light shielding (diffusion) state is attained when a voltage is not applied thereto and a positive type liquid crystal in which the light shielding (diffusion) state is attained when a voltage is applied thereto and the light transmitting state is attained when a voltage is not applied thereto are both known.

In the above Jpn. Pat. Appln. KOKAI Publication No. 5-165017, the construction of a combination of the TN-LCD and PN-LCD is disclosed, the PN-LCD is used in an image area for displaying a scenery and the TN-LCD is used in an area for displaying various types of information items. The PN-LCD is used as the positive type liquid crystal and no voltage is applied thereto to set the same in the light transmitting state. The TN-LCD is also used as the positive type liquid crystal and displays various information by use of a light transmitting portion to which no voltage is applied and a light shielding portion to which a voltage is applied.

It is also known in the art to display information relating to the range of an image and information relating to photographing by printing or marking-off.

In the above Jpn. Pat. Appln. KOKAI Publication No. 5-165017, in order to display a scenery and various types of information items in the finder, the PN-LCD and TN-LCD are used in combination. With the above construction, it is necessary to provide an electrode which faces the whole portion of the scenery display portion in order to set the whole scenery display portion into the light transmitting state or light shielding state. Further, since various types of information items are displayed by use of the light shielding portions to which a voltage is applied, it is necessary to provide electrodes in positions facing the various types of information items, thereby making the construction complicated. If an index is made by use of the positive type LCD, it is difficult to integrally shield light on the index and the upper and lower areas thereof at the time of panorama display.

A method for displaying information relating to the range of an image and information relating to photographing by printing or marking-off has a problem that the number of steps at the manufacturing time is increased and a glass plate exclusively used for marking-off is required.

BRIEF SUMMARY OF THE INVENTION

Accordingly, an object of this invention is to provide a display device of an optical apparatus which is simple in construction and can display information relating to the range of an image and photographing by use of a negative type liquid crystal without using a display method by printing or marking-off.

In order to attain the above object, a camera according to a first aspect of this invention comprises a finder device; a liquid crystal element arranged in the finder device and having an image area and at least one of an index area indicating an image range and an index area indicating information relating to photographing; and a control circuit for switching modes between a first mode in which the image area is set into a light transmitting state and a second mode in which the image area is set into a light shielding state according to a voltage applied to the liquid crystal element; wherein the index areas always provide index display irrespective of application of the voltage to the liquid crystal element.

Further, a camera according to a second aspect of this invention comprises a finder device; and a negative type liquid crystal element arranged in the finder device, for forming an index in the finder device by use of a combination of a light transmitting portion which is changed from a light shielding state to a light transmitting state when a voltage is applied thereto and a light non-transmitting portion which is set in the light shielding state irrespective of application of the voltage.

A finder device according to a third aspect of this invention comprises a negative type liquid crystal element having a light transmitting area which is changed from a light shielding state to a light transmitting state when a voltage is applied thereto and a light non-transmitting area which is set in the light shielding state irrespective of application of the voltage, for forming an index by use of a combination of the light transmitting area and the light non-transmitting area; and a control circuit for controlling the voltage application to the light transmitting area of the negative type liquid crystal element.

A camera capable of switching image sizes according to a fourth aspect of this invention comprises a finder device; and a negative type liquid crystal element arranged in the finder device and having a plurality of light transmitting areas each of which is changed from a light shielding state to a light transmitting state when a voltage is applied thereto and a light non-transmitting area which is formed between the plurality of light transmitting areas and set in the light shielding state irrespective of application of the voltage; wherein the light non-transmitting area is used as an index indicating the image size.

A camera capable of switching image sizes according to a fifth aspect of this invention comprises a finder device; and a negative type liquid crystal element arranged in the finder device and having two facing surfaces including electrode areas each having an electrode; wherein the electrode area provided on at least one of the two facing surfaces has a non-electrode area used as an index for indicating the image size in a portion of the electrode area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A, 4B are views showing the structure of the liquid crystal in the finder according to one embodiment of this invention, FIG. 4C shows display in the finder at the time of normal display, FIG. 4D shows display in the finder at the time of panorama display, and FIG. 4E is a view showing display in the finder when (1) the barrier is closed, (2) four minutes have passed after the barrier is opened or (3) no battery is provided.

DETAILED DESCRIPTION OF THE INVENTION

Figure 1:
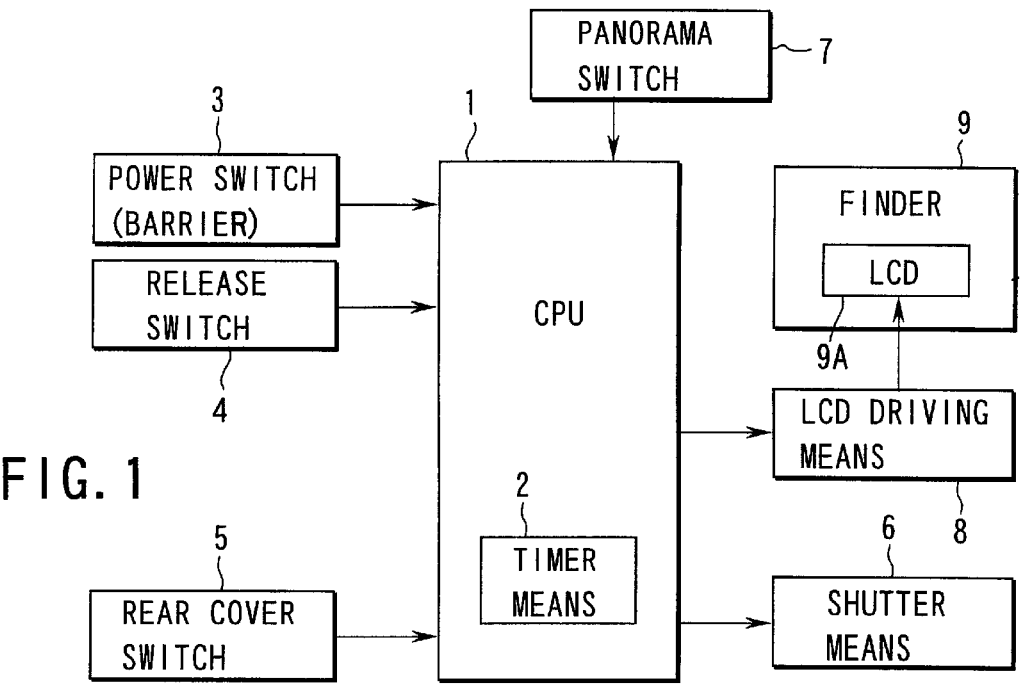
FIG. 1 is a conceptual diagram of a camera to which one embodiment of this invention is applied.

There will now be described an embodiment of this invention in detail with reference to the accompanying drawings. FIG. 1 is a conceptual diagram of a camera to which one embodiment of this invention is applied. In FIG. 1, a CPU 1 used as control means controls various operations of the camera and contains timer means 2. The CPU 1 is connected to a power switch (barrier switch) 3, release switch 4, rear cover switch 5, shutter means 6, panorama switch 7 and the like. Further, the CPU 1 is connected to a finder 9 via LCD driving means 8. In the finder 9, an LCD (which is hereinafter referred to as an in-F LCD) 9A is provided.

Figure 2A:
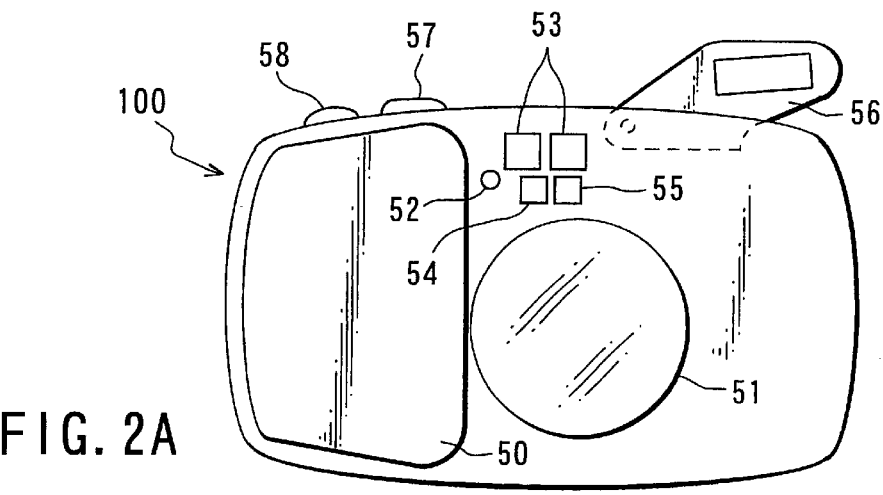
FIG. 2A is a front view of the camera according to this embodiment and FIG. 2B is a top view of the camera.
Figure 2B:
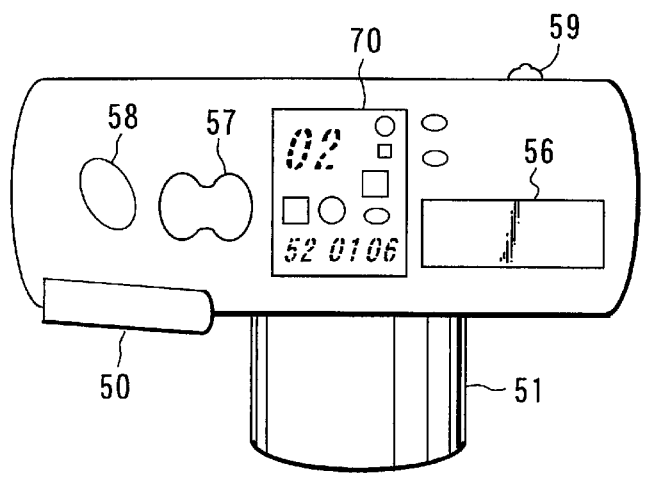

FIG. 2A is a front view of a camera 100 according to this embodiment and FIG. 2B is a top view of the camera 100. On the front side of the camera, AF windows 53, finder 54, photometer window 55 and self LED 52 are provided in the upper central portion and an extendable lens barrel 51 which accommodates an optical system of the camera is provided below them. Further, a barrier 50 is provided on the front left side of the camera. An external liquid crystal display section 70 is provided in the central area of the upper surface of the camera so that the date, various camera modes, the number of frames and the like can be displayed. A release switch (SW) 58 and zoom switch (SW) 57 are provided on the left side of the upper surface as viewed from the front of the camera and a pop-up portion 56 containing a strobe light emitting portion is provided on the right side of the upper surface thereof. Further, on the rear side of the camera, a slide type panorama switch (SW) 59 is provided.

Figure 3A:
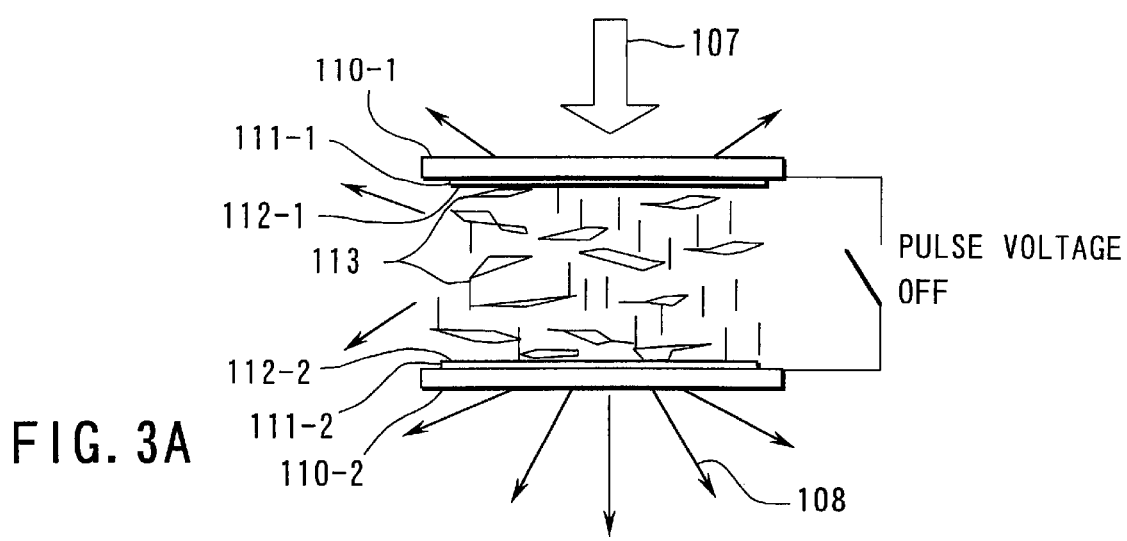
FIGS. 3A and 3B are views showing the structure of a high polymer dispersion type LCD of negative type used in this embodiment, FIG. 3A showing the light shielding state obtained when no voltage is applied and FIG. 3B showing the light transmitting state obtained when a pulse voltage is applied.
Figure 3B:
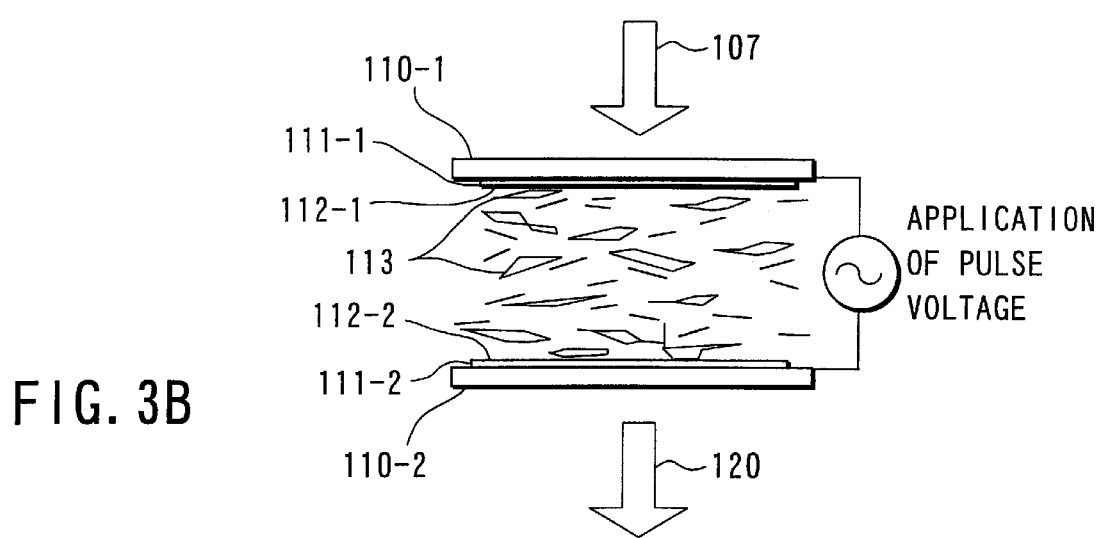

FIG. 3A is a view showing the structure of a negative type PN-LCD used in this embodiment. As shown in FIG. 3A, a pair of light distribution films 112-1 and 112-2, a pair of electrodes 111-1 and 111-2 and a pair of glass base plates 110-1 and 110-2 are sequentially arranged on both sides of high polymer particles 113. FIG. 3A shows the light shielding state obtained when no voltage is applied and incident light 107 is output as scattered light 108. FIG. 3B shows the light transmitting state obtained when a pulse voltage is applied and the incident light 107 is output as emission light 120.

Figure 3C:
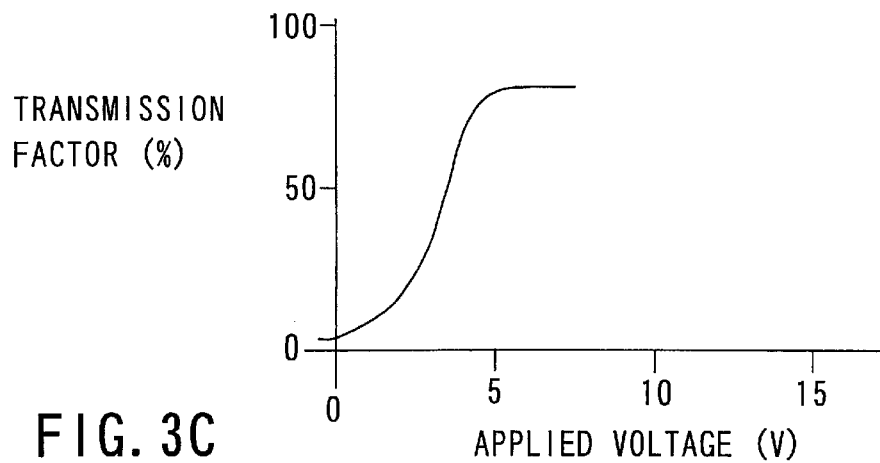
FIG. 3C is a diagram showing the relation between an LCD driving pulse voltage and the transmission factor of the LCD.

FIG. 3C is a diagram showing the relation between an LCD driving pulse voltage and the transmission factor of the LCD. As shown in FIG. 3C, the transmission factor becomes larger as the applied voltage becomes higher.

FIGS. 4A, 4B are views showing the structure of the liquid crystal in the finder according to one embodiment of this invention. In this embodiment, it is assumed that the PN-LCD as explained with reference to FIG. 3A is used with much stress put on the brightness of the finder and high visibility of the index, but this is not limitative and an LCD such as TN-LCD or GH-LCD can be used if it is a negative liquid crystal.

FIG. 4A shows the arrangement of the electrodes of the front surface of the liquid crystal, FIG. 4B shows the arrangement of the electrode of the rear surface of the liquid crystal, FIG. 4C shows display in the finder at the time of normal display, and FIG. 4D shows display in the finder at the time of panorama display. FIG. 4E shows display in the finder when (1) the barrier is closed, (2) four minutes have passed after the barrier is opened or (3) no battery is provided.

As shown in FIG. 4C, the photographing area of the finder has three image areas including an upper area 203', central area 204' and lower area 205', an upper limit index area 208' between the upper area 203' and the central area 204' at the time of panorama display and a lower limit index area 209' between the central area 204' and the lower area 205' at the time of panorama display as index areas indicating the range of an image (index areas indicating the boundary lines of the image size) in addition to the above three image areas, and it further has AF target mark display areas 206A', 206B', 206C' as index areas indicating information relating to photographing (range finding).

As shown in FIG. 4A, the front surface electrode includes an electrode 203 corresponding to the upper area 203', an electrode 204 corresponding to the central area 204', and an electrode 205 corresponding to the lower area 205'. The electrodes 203 and 205 are connected to a SEG2 terminal and the electrode 204 is connected to a SEGI terminal.

As shown in FIG. 4B, a rear surface electrode 210 is connected to a COM terminal via a connecting portion 207' on the rear surface and a connecting portion 207 on the front surface.

No electrode pattern is provided on the front surface areas 208, 209 corresponding to the upper limit index area 208' and lower limit index area 209' in the display at the time of panorama display shown in FIG. 4C and on the front surface areas 206A, 206B, 206C corresponding to the AF target mark display areas 206A', 206B', 206C'. Thus, in this embodiment, the front surface areas corresponding to the upper limit and lower limit index areas at the time of panorama display and the AF target marks are defined as no-electrode areas.

The upper limit index area 208' and lower limit index area 209' correspond to the front surface areas 208 and 209 lying between the electrodes 203, 204 and 205 and are defined only by the areas of the front surface electrodes and can be easily made in the thin line form by narrowing the gap between the electrodes. Further, the rear surface electrode may be formed substantially on the entire rear surface as shown in FIG. 4B and it is not necessary to take misalignment of the glass plates on the front side and rear side into consideration.

With the above structure, in order to attain display in the finder at the time of normal display as shown in FIG. 4C, the upper area 203', central area 204' and lower area 205' are set into the light transmitting state by applying a pulse having a different phase from that of the pulse applied to the COM terminal to the SEGI, SEG2 terminals. In this case, since no electrode is formed on the upper and lower limit index areas at the time of panorama display and the AF target mark areas, light applied to the corresponding portions is shielded and they are displayed black. By placing the LCD on the focusing position in the finder, the visibility of the panorama display and index display can be enhanced.

Further, in order to attain display in the finder at the time of panorama display as shown in FIG. 4D, the central area 204' is set into the light transmitting state by applying a pulse having a different phase from that of the pulse applied to the COM terminal to the SEG1 terminal and applying a pulse having the same phase as that of the pulse applied to the COM terminal to the SEG2 terminal. In this case, since the upper area 203' and the upper limit index area 208' at the time of panorama display are both set in the light shielding state, they integrally form a light shielding area and since the lower area 205' and the lower limit index area 209' at the time of panorama display are both set in the light shielding state, they integrally form a light shielding area.

In order to attain display in the finder as shown in FIG. 4E, the upper area 203', central area 204' and lower area 205' are set into the light transmitting state by applying a pulse having the same phase as that of the pulse applied to the COM terminal to the SEG1, SEG2 terminals or setting the potentials of the COM terminal and the SEG1, SEG2 terminals to the same potential. In this case, since the whole area is set into the light shielding state, the whole area integrally forms a light shielding area. As a result, since the whole image becomes totally black, it is clearly informed to the photographer that it is impossible to photograph.

The upper limit index area 208', lower limit index area 209' and AF target mark display areas 206A', 206B', 206C' are the light non-transmitting portion, the upper area 203', central area 204' and lower area 205' are the light transmissible portion and it is possible to consider that the index can be formed by combining the two portions.

Figure 5:
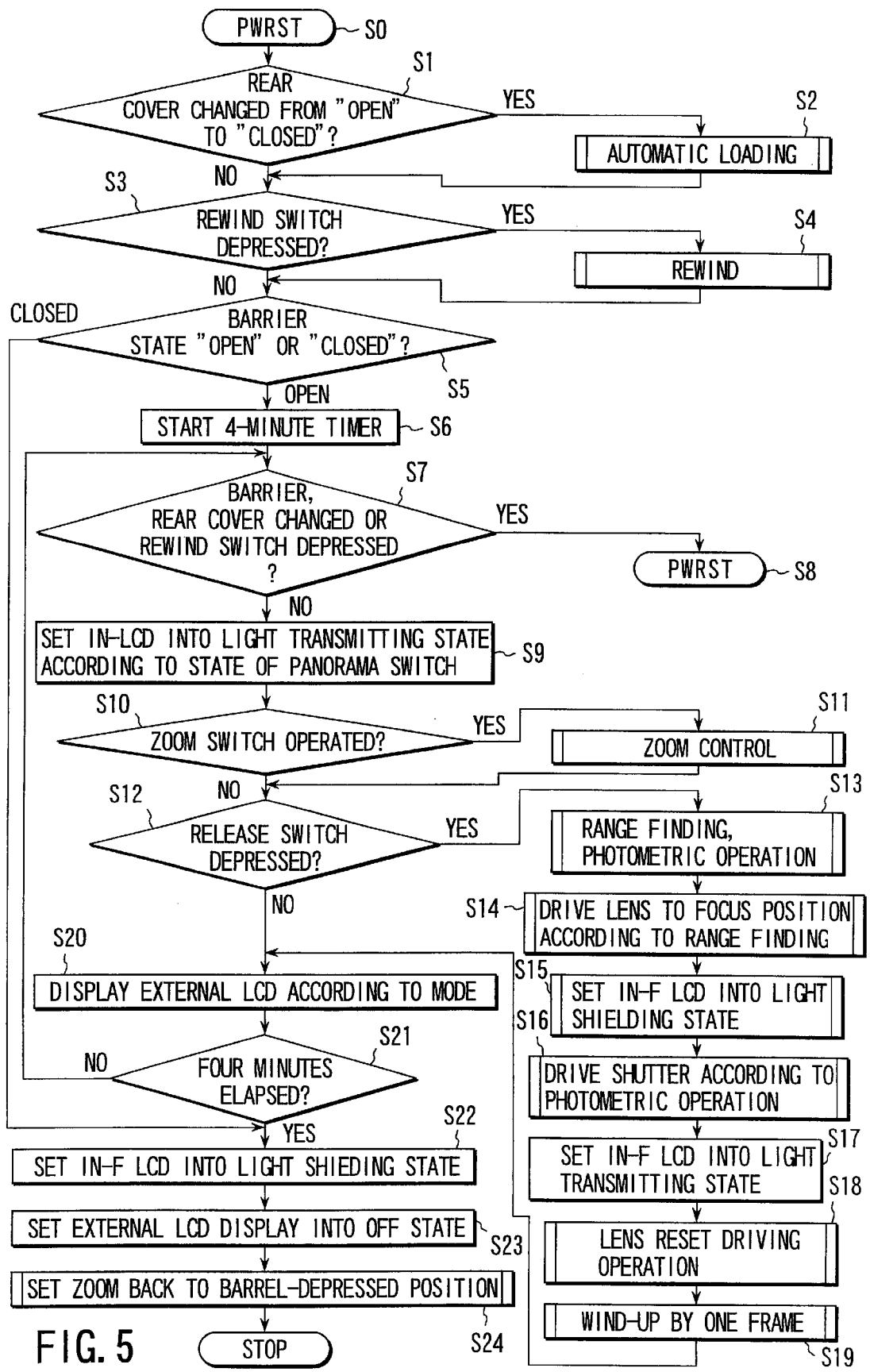
FIG. 5 is a flowchart for illustrating the operation of the camera according to the embodiment of this invention.

The operation of the camera according to the embodiment of this invention is explained below with reference to FIG. 5. If the state of the barrier or rear cover is changed, an interruption occurs and the process starting from the step S0 ("PWRST") is performed. Then, whether or not the rear cover is changed from the "open" state to the "closed" state is determined (step S1), and if the result of determination is "YES", the automatic loading operation (step S2) is performed. After the automatic loading operation is ended or when the result of determination in the step S1 is "NO", the step S3 is effected to determine whether or not the rewind switch is depressed. If the rewind switch is depressed, the step S4 is effected to perform the rewind operation. After the rewind operation is terminated or when the result of determination in the step S3 is "NO", the step S5 is effected to check the barrier state. If it is detected that the barrier is set in the "open" state, the four-minute time counting operation by timer means 2 is started (step S6). If it is detected that the barrier is set in the "closed" state, the step S22 is effected.

After the four-minute time counting operation is started in the step S6, the step S7 is effected to determine whether or not the state of the barrier or rear cover is changed or whether or not the rewind switch is depressed, and if the result of determination is "YES", "PWRST" is effected in the step S8. If the result of determination is "NO", the in-F LCD 9A is set into the light transmitting state (FIG. 4D) according to the state of the panorama switch (step S9).

Next, whether or not the zoom switch is depressed is determined (step S10), and if the result of determination is "YES", the zoom control operation is performed (step S11). After the zoom control operation is performed or when the result of determination in the step S10 is "NO", the step S12 is effected to determine whether or not the release switch is depressed. If the result of determination is "YES", the step S13 is effected to perform the range finding operation and photometric operation. Then, the lens is driven to a focusing position based on the result of the range finding operation (step S14) and the in-F LCD 9A is set into the light shielding state (step S15). Next, the step S16 is effected to perform the shutter driving operation based on the result of the photometric operation in the step S13. Then, the in-F LCD 9A is set into the light transmitting state (step S17) and the lens reset driving operation is performed (step S18). After this, the film is wound up by one frame (step S19).

If the result of determination in the step S12 is "NO" or after the film is wound up by one frame in the step S19, the step S20 is effected to provide the display according to the mode by use of the external LCD. Then, the step S21 is effected to determine whether or not the timer means 4 has counted four minutes, and if the result of determination is "NO", the process returns to the step S7. Further, if the result of determination is "YES", the step S22 is effected to control the in-F LCD 9A to be set into the light shielding state (FIG. 4E). Next, display of the external LCD is set into the OFF state (step S23) and the zoom mechanism is set back to the barrel-depressed position (step S24).

According to the above embodiment, information relating to photographing such as the AF target mark and display of the boundary of the image size can be displayed by use of a negative type liquid crystal which is simple in construction without using a display method by printing or marking-off. Further, as described above, when an index is formed by use of the positive type LCD, it is difficult to integrally shield light in the index together with light in the upper and lower areas thereof at the time of panorama display, but in this embodiment, since the negative type liquid crystal is used, the above problem can be solved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:

a finder device;

a liquid crystal element arranged in said finder device and having an image area and at least one of an index area indicating an image range and an index area indicating information relating to photographing; and a control circuit for switching modes between a first mode in which the image area is set into a light transmitting state and a second mode in which the image area is set into a light shielding state according to a voltage applied to said liquid crystal element;

wherein the index areas always provide index display irrespective of the voltage applied to said liquid crystal element.

2. A camera according to claim 1, wherein the index area indicating the image range is an index area indicating the boundary of an image size and the index area indicating information relating to photographing is an index area indicating a range finding area.

3. A camera comprising:

a finder device; and a negative type liquid crystal element arranged in said finder device, for forming an index in said finder device by use of a combination of a light transmitting portion which is changed from a light shielding state to a light transmitting state when a voltage is applied thereto and a light non-transmitting portion which is set in the light shielding state irrespective of the voltage applied thereto.

4. A camera comprising:

a finder device;

a negative type liquid crystal element arranged in said finder device, for forming an index by use of a combination of a light transmitting portion which is changed from a light shielding state to a light transmitting state when a voltage is applied thereto and a light non-transmitting portion which is set in the light shielding state irrespective of the voltage applied thereto; and a control circuit for controlling the voltage application to the light transmitting area of the negative type liquid crystal element.

5. A finder device comprising:

a negative type liquid crystal element having a light transmitting area which is changed from a light shielding state to a light transmitting state when a voltage is applied thereto and a light non-transmitting area which is set in the light shielding state irrespective of application of the voltage, for forming an index by use of a combination of the light transmitting area and the light non-transmitting area; and a control circuit for controlling the voltage application to the light transmitting area of the negative type liquid crystal element.

6. A finder device according to claim 5, wherein the index is an index indicating a range finding area.

7. A finder device according to claim 5, wherein the index is an index indicating a boundary line of an image size.

8. A camera capable of switching image sizes comprising:

a finder device; and a negative type liquid crystal element arranged in said finder device and having a plurality of light transmitting areas each of which is changed from a light shielding state to a light transmitting state when a voltage is applied thereto and a light non-transmitting area which is formed between the plurality of light transmitting areas and set in the light shielding state irrespective of application of the voltage;

wherein the light non-transmitting area is used as an index indicating the image size.

9. A camera according to claim 8, wherein the plurality of light transmitting areas of said negative type liquid crystal element include first, second and third light transmitting areas of substantially rectangular shape arranged in parallel and the light non-transmitting area has two linear areas formed between the three light transmitting areas and indicating the boundary line of the image size.

10. A camera according to claim 9, wherein the second light transmitting area has a light non-transmitting portion for displaying a range finding area.

11. A camera capable of switching image sizes comprising:

a finder device; and a negative type liquid crystal element arranged in said finder device and having two facing surfaces including electrode areas each having an electrode;

wherein the electrode area provided on at least one of the two facing surfaces has a non-electrode area used as an index for indicating the image size in a portion of the electrode area.

12. A camera comprising:

a range finding device for measuring a distance to a subject;

a finder device for visually recognizing the subject; and a negative type liquid crystal element arranged in said finder device and having two facing surfaces including electrode areas each having an electrode;

wherein the electrode area provided on at least one of the two facing surfaces has a non-electrode area used as an index for indicating a range finding area.

13. A camera capable of switching image sizes comprising:

a finder device; and a negative type liquid crystal element arranged in said finder device and having two facing surfaces including electrode areas each having an electrode;

wherein the electrode area provided on at least one of the two facing surfaces has a linear non-electrode area used as an index for indicating the image size in a portion of the electrode area.

14. A camera according to claim 13, wherein the non-electrode area is an index for indicating the image size for panorama photographing.

* * * * *